(12) United States Patent
Rajagopalan et al.

(10) Patent No.: US 9,149,690 B2
(45) Date of Patent: *Oct. 6, 2015

(54) THERMOSET POLYURETHANES BASED ON MOISTURE-RESISTANT POLYOLS FOR USE IN GOLF BALLS

(71) Applicant: Acushnet Company, Fairhaven, MA (US)

(72) Inventors: Murali Rajagopalan, South Dartmouth, MA (US); Michael Michalewich, Mansfield, MA (US); Shawn Ricci, New Bedford, MA (US); Michael J. Sullivan, Old Lyme, CT (US)

(73) Assignee: Acushnet Company, Fairhaven, MA (US)

( * ) Notice: Subject to any disclaimer, the term of this patent is extended or adjusted under 35 U.S.C. 154(b) by 66 days.

This patent is subject to a terminal disclaimer.

(21) Appl. No.: 14/014,503

(22) Filed: Aug. 30, 2013

(65) Prior Publication Data

US 2014/0004976 A1     Jan. 2, 2014

Related U.S. Application Data

(63) Continuation of application No. 12/762,410, filed on Apr. 19, 2010, now Pat. No. 8,524,852.

(51) Int. Cl.
| | |
|---|---|
| *A63B 37/12* | (2006.01) |
| *A63B 37/00* | (2006.01) |
| *C08G 18/42* | (2006.01) |
| *C08G 18/62* | (2006.01) |
| *C08L 75/04* | (2006.01) |

(52) U.S. Cl.
CPC ......... *A63B 37/0075* (2013.01); *A63B 37/0031* (2013.01); *A63B 37/0062* (2013.01); *A63B 37/0076* (2013.01); *A63B 37/0092* (2013.01); *A63B 37/0093* (2013.01); *C08G 18/423* (2013.01); *C08G 18/4233* (2013.01); *C08G 18/6208* (2013.01); *C08L 75/04* (2013.01); *A63B 37/0064* (2013.01)

(58) Field of Classification Search
None
See application file for complete search history.

(56) References Cited

U.S. PATENT DOCUMENTS

| | | | |
|---|---|---|---|
| 6,083,119 A | 7/2000 | Sullivan et al. | |
| 6,103,822 A | 8/2000 | Housel et al. | |
| 6,117,025 A | 9/2000 | Sullivan | |
| 6,340,503 B1 | 1/2002 | Simonds et al. | |
| 6,435,986 B1 | 8/2002 | Wu et al. | |
| 6,610,812 B1 | 8/2003 | Wu et al. | |
| 6,685,579 B2 | 2/2004 | Sullivan | |
| 6,736,737 B2 | 5/2004 | Higuchi et al. | |
| 6,903,178 B2 | 6/2005 | Wu et al. | |
| 7,014,574 B2 | 3/2006 | Wu et al. | |
| 7,037,985 B2 | 5/2006 | Kim et al. | |
| 7,387,581 B2 | 6/2008 | Higuchi et al. | |
| 7,481,956 B2 | 1/2009 | Wu et al. | |
| 7,510,488 B2 | 3/2009 | Higuchi et al. | |
| 8,288,478 B2 * | 10/2012 | Rajagopalan et al. | ........ 525/131 |
| 8,524,852 B2 * | 9/2013 | Rajagopalan et al. | .......... 528/64 |
| 2002/0049297 A1 | 4/2002 | Suzuki et al. | |
| 2005/0143525 A1 | 6/2005 | Wu et al. | |
| 2005/0228160 A1 | 10/2005 | Wu et al. | |
| 2006/0009309 A1 | 1/2006 | Rajagopalan et al. | |
| 2007/0270242 A1 | 11/2007 | Keller et al. | |
| 2009/0011862 A1 * | 1/2009 | Bulpett et al. | ................ 473/376 |
| 2009/0192262 A1 | 7/2009 | Meltzer et al. | |
| 2011/0207556 A1 | 8/2011 | Rajagopalan et al. | |

OTHER PUBLICATIONS

European Polymer Journal; Jornal 39 (2003) 1281-1290; Studies on allophanate-urethane networks based on hydroxyl terminated polybutadiene: effect of isocyanate type of the network characteristics; V. Sekkar, S. Gopalakrishnana and Ambika Devi.
Croda product literature for Priplast; dated 2000.

* cited by examiner

*Primary Examiner* — David Buttner
(74) *Attorney, Agent, or Firm* — Daniel W. Sullivan

(57) ABSTRACT

The present invention provides golf balls having a rubber core, and a cover layer made from a thermoset polyurethane of polyurethane-urea that is the reaction product of a polyisocyanate with moisture-resistant polyol and curing agent. An intermediate layer, formed from an olefin-based acid copolymer ionomer composition and preferably an ethylene acid copolymer, is disposed between the rubber core and cover. The moisture-resistant polyol is preferably a reaction product of dimer acid or dimer ester and a polyolefin diol, or a polybutadiene polyol, or a polyisoprene. Preferably, the cover layer has a moisture vapor transmission rate (MVTR) between 3 grams·mm/m²·day to 4 grams·mm/m²·day.

10 Claims, 3 Drawing Sheets

THERMOSET POLYURETHANES BASED ON MOISTURE-RESISTANT POLYOLS FOR USE IN GOLF BALLS

CROSS-REFERENCE TO RELATED APPLICATIONS

This application is a continuation of, co assigned U.S. patent application Ser. No. 12/762,410 having a filing date of Apr. 19, 2010, now issued as U.S. Pat. No. 8,524,852 with an issue date of Sep. 3, 2013, the entire disclosure of which is hereby incorporated by reference.

BACKGROUND OF THE INVENTION

1. Field of the Invention

The present invention relates generally to golf balls containing at least one layer made from a thermoset polyurethane or polyurethane-urea composition that is based on a moisture-resistant polyol. More particularly, the composition is produced from a reaction of polyisocyanate with a moisture-resistant polyol and curing agent. The composition may be used to form any layer in the golf ball such as, for example, an outer core, intermediate layer, inner cover, and/or outer cover. The resulting golf ball has desirable playing performance properties including high resiliency, toughness, impact durability, moisture-resistance, and soft feel.

2. Brief Review of the Related Art

Today, multi-piece solid golf balls are popular for several reasons including new manufacturing methods, the availability and cost of raw materials, and the playing performance properties of such balls. For example, three-piece solid golf balls having an inner core and outer cover with an intermediate layer disposed there between are commonly used by both professional and recreational golfers. Many multi-piece balls are designed to have an optimum combination of playing properties. Particularly, such balls are designed to have high durability and resiliency as well as a soft feel. The durability and toughness of the ball protects it from being cut, torn, and otherwise damaged. Balls having a high resiliency tend to reach a high velocity when struck by a golf club. As a result, the ball tends to travel a greater distance which is particularly important for driver shots off the tee. Meanwhile, the soft feel of the ball provides the player with a more pleasant sensation when he/she strikes the ball with the club. The player senses more control over the ball as the club face makes impact. The soft feel of the ball's cover allows players to place a spin on the ball and better control its flight pattern which is particularly important for approach shots near the green.

In conventional multi-piece golf balls, the inner core is made commonly of a rubber material such as natural and synthetic rubbers, styrene butadiene, polybutadiene, poly (cis-isoprene), poly(trans-isoprene), or highly neutralized acid copolymers. Often, the intermediate layer is made of an olefin-based ionomer resin that imparts some hardness to the ball. These ionomer acid copolymers contain inter-chain ionic bonding and are generally made of an α-olefin such as ethylene and a vinyl comonomer having an acid group such as methacrylic, acrylic acid, or maleic acid. Metal ions such as sodium, lithium, zinc, and magnesium are used to neutralize the acid groups in the copolymer. Commercially available olefin-based copolymer ionomer resins are used in different industries and include numerous resins sold under the trademarks, Surlyn® (available from DuPont) and Escor® and Iotek® (available from ExxonMobil), Amplify IO® (available from Dow Chemical) and Clarix® (available from A. Schulman). Olefin-based copolymer ionomer resins are available in various grades and identified based on the type of base resin, molecular weight, and type of metal ion, amount of acid, degree of neutralization, additives, and other properties. Finally, the outer cover of conventional golf balls are made from a variety of materials including olefin-based copolymer ionomers, polyamides, polyesters, and thermoplastic and thermoset polyurethane and polyurea elastomers.

In recent years, there has been substantial interest in using thermoset and thermoplastic polyurethanes to make cover layers for the golf balls. Polyurethane golf ball covers are of particular interest because they can be formulated to provide the golf ball with high resiliency and durability as well as a soft feel. Basically, polyurethane compositions contain urethane linkages formed by reacting an isocyanate group (—N═C═O) with a hydroxyl group (OH). Polyurethanes are produced by the reaction of a polyisocyanate with a polyol in the presence of a catalyst and other additives. The chain length of the polyurethane prepolymer is extended by reacting it with a hydroxyl-terminated curing agent. Hybrid compositions containing urethane and urea linkages also may be produced. For example, a polyurethane/urea hybrid composition may be produced when polyurethane prepolymer is reacted with an amine-terminated curing agent.

Golf balls made with polyurethane and polyurea materials are generally described in the patent literature, for example, U.S. Pat. Nos. 5,334,673; 5,484,870; 6,476,176; 6,506,851; 6,867,279; 6,958,379; 6,960,630; 6,964,621; 7,041,769; 7,105,623; 7,131,915; and 7,186,777. As discussed above, in general, isocyanate compounds with two or more functional groups are reacted with polyols to form the polyurethane compositions. There are various known methods for making thermoplastic polyurethanes. For example, Meltzer et al., U.S. Patent Application Publication No. US 2009/0192262 describes a specific method for making hydrophobic thermoplastic polyurethanes. According to the '262 Publication, a polyol, a polyisocyanate, and a linear diol chain extender containing 5 carbon atoms or 7 to 12 carbon atoms are required as the reactants. There is no disclosure of isocyanate or polyol compounds containing acidic or ionic moieties. The '262 Publication discloses that the thermoplastic polyurethane compositions may be used for over-molding soft grips onto tools and kitchen utensils, and in adhesives and protective coatings.

Although many conventional golf balls containing polyurethane components or layers have good mechanical and playing properties, there is a continuing need for improved polyurethane golf balls. The improved golf balls should have high resiliency, impact durability, and toughness as well as features that make the ball easy to play with, particularly a pleasant feel, softness, and the like. The present invention provides methods for making such golf balls and the resultant balls. The present invention relates to multi-layered golf balls made from a composition comprising a thermoset polyurethane or polyurethane-urea. The composition may be used to form any layer in the golf ball structure such as, for example, outer core, intermediate layer, inner cover, and/or outer cover. The golf balls made of the compositions of this invention are highly resilient and have good impact durability and toughness. Moreover, the ball has a soft feel and optimum playing performance properties.

SUMMARY OF THE INVENTION

The present invention relates to multi-layered golf balls made from a composition comprising a thermoset polyurethane or polyurethane-urea that is based on a moisture-resistant polyol. The thermoset composition preferably has a cross-link density in the range of about 10 to about 300 mol/m$^3$ and a Vicat softening temperature in the range of about 60° to about 180° C. More particularly, the composition is formed from: i) an isocyanate compound, ii) a moisture-resistant polyol having a weight average molecular weight in the range of 500 to 10,000 grams per mole, and iii) a curing agent. The composition may be used to form any layer in the golf ball structure such as for example, outer core, intermediate layer, inner cover, and/or outer cover. The golf balls made of the composition of this invention are highly resilient and have good impact durability and toughness. The composition provides the golf ball with good moisture-resistance. Moreover, the ball's cover has a soft feel and the ball has optimum playing performance properties.

In one preferred embodiment, the ball includes a core which can be made of polybutadiene, highly neutralized polymer, or other suitable material. The core preferably has a Shore C surface hardness in the range of about 50 to about 90. An intermediate layer comprising a thermoplastic or thermoset composition surrounds the core. One example of a suitable thermoplastic composition that can be used to form the intermediate layer is an ethylene-based copolymer ionomer. A cover comprising the thermoset polyurethane or polyurethane-urea composition of this invention surrounds the intermediate layer, and the cover has a Shore C surface hardness in the range of about 60 to about 95. This thermoset cover composition is the reaction product of: i) an isocyanate compound, ii) a moisture-resistant polyol having a weight average molecular weight in the range of 500 to 10,000 grams per mole, and iii) a curing agent selected from hydroxyl-terminated or amine-terminated curing agents, and mixtures thereof. The resulting thermoset composition preferably has a cross-link density in the range of about 10 to about 300 mol/m$^3$ and a Vicat softening temperature in the range of about 60° to about 180° C. In one preferred embodiment, the core has a diameter of about 1.26 to about 1.60 inches and surface hardness of about 30 to about 65 Shore D; the intermediate layer has a thickness of about 0.015 to about 0.120 inches and surface hardness of about 45 to about 75 Shore D; and the cover layer has a thickness of about 0.015 to about 0.090 inches and material hardness of about 40 to about 65 Shore D.

Different moisture-resistant polyols may be used. For instance, the moisture-resistant polyol may be the reaction product of dimer acid or dimer ester and a polyolefin diol, polybutadiene polyol, or polyisoprene diol. In one example, the polybutadiene polyol or polyisoprene diol are hydrogenated. In yet another version, a polyether-ester diol, which is the reaction product of dimer acid or dimer ester and polyether diol, is used. A polycaprolactone-ester diol, which is the reaction product of dimer acid or dimer ester and polycaprolactone diol, also may be used. The moisture-resistant polyol may be prepared by dimerizing unsaturated aliphatic monocarboxylic acid or ester containing 10 to 60 carbon atoms followed by reacting it with a monomeric or polymeric diol. In one preferred version, the moisture-resistant polyol is a branched polyester polyol containing 36 carbon atoms.

In a second preferred embodiment, the ball includes a core having a Shore C surface hardness in the range of about 60 to about 95. An intermediate layer comprising a thermoplastic or thermoset composition surrounds the core. One example of a suitable thermoplastic composition that can be used to form the intermediate layer is an ethylene-based copolymer ionomer. A multi-layered cover with inner and outer cover layers comprising the polyurethane or polyurethane-urea composition of this invention surrounds the intermediate layer, and the cover has a Shore C surface hardness in the range of about 50 to about 90.

Preferably, the thermoset polyurethane or polyurethane-urea polymer composition has a Vicat softening temperature of 60° to 180° C., and material Shore D hardness of about 30 to about 75. The thermoset polyurethane or polyurethane-urea composition is post cross-linked using a chemical or radiation cross-linking process. In one version, the reaction used to produce the thermoset polyurethane or polyurethane-urea composition is a one-step reaction. In a second version, the reaction used to produce the thermoset polyurethane or polyurethane-urea composition is a two-step reaction, wherein the first step comprises reacting the isocyanate compound and moisture-resistant polyol to form a prepolymer and the second step comprises reacting the prepolymer with the curing agent.

BRIEF DESCRIPTION OF THE DRAWINGS

The novel features that are characteristic of the present invention are set forth in the appended claims However, the preferred embodiments of the invention, together with further objects and attendant advantages, are best understood by reference to the following detailed description in connection with the accompanying drawings in which:

DETAILED DESCRIPTION OF THE PREFERRED EMBODIMENTS

Figure 1:
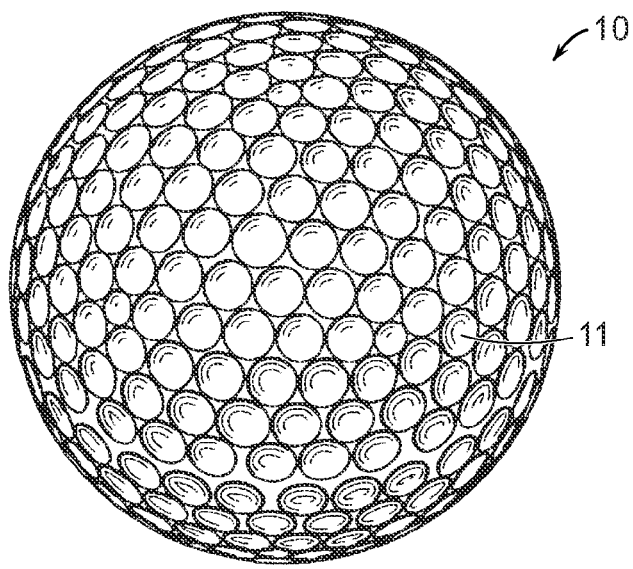
FIG. 1 is a front view of a dimpled golf ball made in accordance with the present invention.

The present invention relates generally to golf balls containing at least one "layer" made from a thermoset polyurethane or polyurethane-urea composition that is produced by a reaction of: i) an isocyanate compound, ii) a moisture-resistant polyol having an average molecular weight in the range of 500 to 10,000 grams per mole and a hydroxyl value in the range of 30 to 120, and iii) a curing agent selected from hydroxyl-terminated and amine-terminated curing agents and mixtures thereof. The term, "layer" as used herein means generally any spherical portion of a golf ball. The polyurethane or polyurethane-urea composition of this invention may be used to form any layer in the golf ball structure including, but not limited to, an outer cover, inner cover, intermediate layer, and/or outer core layer.

Isocyanate Compounds

Any suitable isocyanate known in the art can be used to produce the polyurethane composition in accordance with this invention. Such isocyanates include, for example, aliphatic, cycloaliphatic, aromatic aliphatic, aromatic, any derivatives thereof, and combinations of these compounds having two or more isocyanate (—N=C=O) groups per molecule. The isocyanates may be organic polyisocyanate-terminated prepolymers, isocyanate prepolymers having a low residual amount of unreacted isocyanate monomer ("low free" isocyanates), and mixtures thereof. The isocyanate-containing reactable component also may include any isocyanate-functional monomer, dimer, trimer, or polymeric adduct thereof, prepolymer, quasi-prepolymer, or mixtures thereof. Isocyanate-functional compounds may include monoisocyanates or polyisocyanates that include any isocyanate functionality of two or more.

Preferred isocyanates include diisocyanates (having two NCO groups per molecule), biurets thereof, dimerized uretdiones thereof, trimerized isocyanurates thereof, and polyfunctional isocyanates such as monomeric triisocyanates. Diisocyanates typically have the generic structure of OCN—R—NCO. Exemplary diisocyanates include, but are not limited to, unsaturated isocyanates such as: p-phenylene diisocyanate ("PPDI," i.e., 1,4-phenylene diisocyanate), m-phenylene diisocyanate ("MPDI," i.e., 1,3-phenylene diisocyanate), o-phenylene diisocyanate (i.e., 1,2-phenylene diisocyanate), 4-chloro-1,3-phenylene diisocyanate, toluene diisocyanate ("TDI"), m-tetramethylxylene diisocyanate ("m-TMXDI"), p-tetramethylxylene diisocyanate ("p-TMXDI"), 1,2-, 1,3-, and 1,4-xylene diisocyanates, 2,2'-, 2,4'-, and 4,4'-biphenylene diisocyanates, 3,3'-dimethyl-4,4'-biphenylene diisocyanate ("TODI"), 2,2'-, 2,4'-, and 4,4'-diphenylmethane diisocyanates ("MDI"), 3,3'-dimethyl-4,4'-diphenylmethane diisocyanate, carbodiimide-modified MDI, polyphenylene polymethylene polyisocyanate ("PMDI," i.e., polymeric MDI), 1,5-naphthalene diisocyanate ("NDI"), 1,5-tetrahydronaphththalene diisocyanate, anthracene diisocyanate, tetracene diisocyanate; and saturated isocyanates such as: 1,4-tetramethylene diisocyanate, 1,5-pentamethylene diisocyanate, 2-methyl-1,5-pentamethylene diisocyanate, 1,6-hexamethylene diisocyanate ("HDI") and isomers thereof, 2,2,4- and 2,4,4-trimethylhexamethylene diisocyanates, 1,7-heptamethylene diisocyanate and isomers thereof, 1,8-octamethylene diisocyanate and isomers thereof, 1,9-nonamethylene diisocyanate and isomers thereof, 1,10-decamethylene diisocyanate and isomers thereof, 1,12-dodecane diisocyanate and isomer thereof, 1,3-cyclobutane diisocyanate, 1,2-, 1,3-, and 1,4-cyclohexane diisocyanates, 2,4- and 2,6-methylcyclohexane diisocyanates, isophorone diisocyanate ("IPDI"), isocyanatomethylcyclohexane isocyanate, isocyanatoethylcyclohexane isocyanate, 4,4'-dicyclohexylmethane diisocyanate ("$H_{12}$ MDI," i.e., bis(4-isocyanatocyclohexyl)-methane), and 2,4'- and 4,4'-dicyclohexane diisocyanates. Dimerized uretdiones of diisocyanates and polyisocyanates include, for example, unsaturated isocyanates such as uretdiones of toluene diisocyanates, uretdiones of diphenylmethane diisocyanates; and saturated isocyanates such as uretdiones of hexamethylene diisocyanates. Trimerized isocyanurates of diisocyanates and polyisocyanates include, for example, unsaturated isocyanates such as trimers of diphenylmethane diisocyanate, trimers of tetramethylxylene diisocyanate, isocyanurates of toluene diisocyanates; and saturated isocyanates such as isocyanurates of isophorone diisocyanate, isocyanurates of hexamethylene diisocyanate, isocyanurates of trimethyl-hexamethylene diisocyanates. Monomeric triisocyanates include, for example, unsaturated isocyanates such as 2,4,4'-diphenylene triisocyanate, 2,4,4'-diphenylmethane triisocyanate, 4,4',4"-triphenylmethane triisocyanate; and saturated isocyanates such as: 1,3,5-cyclohexane triisocyanate.

Other suitable isocyanates include acid functionalized isocyanates containing acid groups such as, for example, carboxylic, sulfonic, or phosphoric acid groups. The acid content may be, for example, in the range of about 2.5 wt. % to about 25 wt. %, preferably about 5 to about 20 wt. %, based on weight of polymer composition. Also, the acid groups of the acid-functionalized isocyanates may be partially, highly, or fully neutralized using organic or inorganic cations to form ionomers. For example, the neutralization level may be from 10 to 80%, more preferably 20 to 70%, and most preferably 30 to 50% for partially-neutralized ionomers. In another embodiment, the neutralization level is from 80 to 100%, more preferably 90 to 100%, and most preferably 95 to 100% for highly or fully-neutralized ionomers. By incorporating acid or ionic groups into the backbone of the isocyanates, the properties of the resulting polyurethane such as scuff/abrasion-resistance and resiliency can be enhanced.

Preferably, the isocyanate compound is selected from the group consisting of monomeric, oligomeric, or polymeric isophorone diisocyanate (IPDI); hexamethylene diisocyanate (HDI); 1,4-cyclohexyl diisocyanate (CHDI); 4,4'-dicyclohexylmethane diisocyanate ($H_{12}$MDI); 4,4'-dicyclohexylmethane diisocyanate (4,4'-MDI); 4,4'-diphenylmethane diisocyanate ("MDI"); toluene diisocyanate (TDI); p-phenylene diisocyanate (PPDI); 1,5-naphthalene diisocyanate ("NDI"); xylene diisocyanate ("XDI"); and tetramethylxylene diisocyanate (TMXDI"); and mixtures thereof.

Polyol Compounds

As discussed above, a polyurethane composition is generally an elastomeric material that is the reaction product of isocyanate and hydroxyl components. There are many polyol compounds known in the art. Surprisingly, it has been found that a moisture-resistant polyol that is the reaction of product of a dimer acid or dimer ester and a polyolefin diol, polybutadiene polyol, or polyisoprene diol is particularly effective and provides a polyurethane composition having many advantageous properties for purposes of this invention. For instance, because of the moisture-resistant polyols, the resulting polyurethane compositions of this invention will tend to have greater moisture-resistance than polyurethane compositions prepared from polyols that are not highly moisture-resistant. In a second preferred embodiment, the dimer acid or dimer ester is reacted with a hydrogentated polybutadiene or hydrogenated polyisoprene diol to produce a moisture-resistant polyol that, in turn, can be reacted with the isocyanate compound to produce the polyurethane composition. Another preferred moisture-resistant polyol that can be used in this invention is a polyether-ester diol that is the reaction product of a dimer acid or dimer ester and a polyether diol. In yet another preferred version, the moisture-resistant polyol is a polycaprolactone-ester diol that is the reaction product of a dimer acid and polycaprolactone diol.

Other suitable polyols include acid functionalized polyols containing acid groups such as, for example, carboxylic, sulfonic, or phosphoric acid groups. The acid content may be, for example, in the range of about 2.5 wt. % to about 25 wt. %, preferably about 5 to about 20 wt. %, based on weight of polymer composition. Also, the acid groups of the acid-functionalized polyols may be partially, highly, or fully neutralized using organic or inorganic cations to form ionomers. For example, the neutralization level may be from 10 to 80%, more preferably 20 to 70%, and most preferably 30 to 50% for partially-neutralized ionomers. In another embodiment, the neutralization level is from 80 to 100%, more preferably 90 to 100%, and most preferably 95 to 100% for highly or fully-neutralized ionomers. By incorporating acid or ionic groups into the backbone of the polyols, the properties of the resulting polyurethane such as tensile strength, impact durability, resiliency, and toughness can be enhanced. Mixtures of the above-described moisture-resistant polyols also can be used in accordance with this invention.

Dimer acids and dimer esters are commercially available and can be used to prepare the moisture-resistant polyols of this invention. They are normally prepared by dimerizing unsaturated long chain aliphatic monocarboxylic acids, usually of 10 to 60 carbon atoms, or their esters (alkyl esters). This is followed by reacting the dimer acid or dimer ester with a monomeric or polymeric polyol. Certain moisture-resistant polyols are commercially available and can be used in accordance with this invention. For example, Priplast™ olyester polyols, available from Uniqema of Gouda (The Netherlands) are branched $C_{36}$ moisture-resistant polyols that can be used. The moisture-resistant polyol used in synthesizing the thermoset polyurethane of this invention typically will have a weight average molecular weight in the range of about 500 to about 10,000 grams per mole and preferably will have a hydroxyl value in the range of 30 to 120 mg KOH/g (as measured in accordance with ASTM E-222). The moisture-resistant polyols used in this invention have high hydrolytic resistance and tensile strength. Thus, they can be reacted with isocyanate compounds and curing agents to produce polyurethane compositions having ideal properties as discussed further below. Moreover, the moisture-resistant polyols have a highly moisture-resistant backbone. Thus, the resulting polyurethanes compositions will tend to be more moisture-resistant than polyurethanes prepared from polyols that do not have a moisture-resistant backbone.

Manufacturing Processes

There are two basic techniques that can be used to make the polyurethane compositions of this invention: a) one-shot technique, and b) prepolymer technique. In the one-shot technique, the isocyanate, polyol, and hydroxyl and/or amine-terminated curing agent are reacted in one step. The prepolymer technique involves a first reaction between the isocyanate and polyol compounds to produce a polyurethane prepolymer, and a subsequent reaction between the prepolymer and hydroxyl and/or amine-terminated curing agent. As a result of the reaction between the isocyanate and polyol compounds, there will be some unreacted NCO groups in the polyurethane prepolymer. The prepolymer should have less than 14% unreacted NCO groups. Preferably, the prepolymer has no greater than 8.5% unreacted NCO groups, more preferably from 2.5% to 8%, and most preferably from 5.0% to 8.0% unreacted NCO groups. As the weight percent of unreacted isocyanate groups increases, the hardness of the composition also generally increases.

Either the one-shot or prepolymer method may be employed to produce the thermoset polyurethane compositions of the invention. In one embodiment, the one-shot method is used, wherein the isocyanate compound is added to a reaction vessel and then a curative mixture comprising the polyol and curing agent is added to the reaction vessel. The components are mixed together so that the molar ratio of isocyanate compound to total polyol and curing agent compounds is in the range of about 1.01:1.00 to about 1.10:1.00. Preferably, the molar ratio is greater than 1.05:1.00. For example, the molar ratio can be in the range of 1.07:1.00 to 1.10:1.00. In general, the prepolymer technique is preferred because it provides better control of the chemical reaction. The prepolymer method provides a more homogeneous mixture resulting in a more consistent polymer composition. In one embodiment, the prepolymer method is used, wherein the isocyanate and polyol compounds are reacted to produce a polyurethane prepolymer. This is followed by a reaction between the prepolymer and curing agent to form the final polymer composition. In the prepolymer method, the prepolymer is mixed with the curing agent so that the molar ratio of isocyanate groups to hydroxyl groups (and/or amine groups) is in the range of about 1.01:1.00 to about 1.10:1.00. Preferably, the molar ratio is greater than 1.05:1.00. For example, the molar ratio can be in the range of 1.07:1.00 to 1.10:1.00.

The resulting polyurethane prepolymer contains urethane linkages having the following general structure:

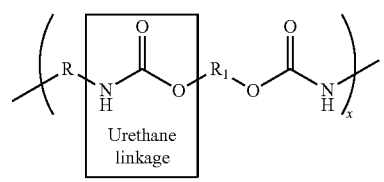

where x is the chain length, i.e., about 1 or greater, and R and $R_1$ are straight chain or branched hydrocarbon chain having about 1 to about 20 carbons In general, polyurethanes are classified as either thermoplastic or thermosetting materials. Thermoplastic polyurethanes have some cross-linking, but it is primarily through hydrogen bonding or other physical mechanism. Because of their lower level of cross-linking, thermoplastic polyurethanes are relatively flexible. The cross-linking bonds in thermoplastic polyurethanes can be reversibly broken by increasing temperature such as during molding or extrusion. That is, the theremoplastic material softens when exposed to heat and returns to its original condition when cooled. On the other hand, thermoset polyurethanes become irreversibly set when they are cured. The cross-linking bonds are irreversibly set and are not broken when exposed to heat. Thus, thermoset polyurethanes, which typically have a high level of cross-linking, are relatively rigid.

Chain-Extending of Prepolymer

As discussed above, either the one-shot or prepolymer method may be used to form the thermoset polyurethane composition. In the prepolymer method, the polyurethane prepolymer can be chain-extended by reacting it with a single curing agent or blend of curing agents. In general, the prepolymer can be reacted with hydroxyl-terminated curing agents, amine-terminated curing agents, or mixtures thereof. The curing agents extend the chain length of the prepolymer and build-up its molecular weight. The compositions of the present invention are castable thermoset polyurethane materials.

A catalyst may be employed to promote the reaction between the isocyanate and polyol compounds for producing the prepolymer or between prepolymer and curing agent during the chain-extending step. Preferably, the catalyst is added to the reactants before producing the prepolymer. Suitable catalysts include, but are not limited to, bismuth catalyst; zinc octoate; stannous octoate; tin catalysts such as bis-butyltin dilaurate, bis-butyltin diacetate, stannous octoate; tin (II) chloride, tin (IV) chloride, bis-butyltin dimethoxide, dimethyl-bis[1-oxonedecyl)oxy]stannane, di-n-octyltin bis-isooctyl mercaptoacetate; amine catalysts such as triethylene-diamine, triethylamine, and tributylamine; organic acids such as oleic acid and acetic acid; delayed catalysts; and mixtures thereof. The catalyst is preferably added in an amount sufficient to catalyze the reaction of the components in the reactive mixture. In one embodiment, the catalyst is present in an amount from about 0.001 percent to about 1 percent, and preferably 0.1 to 0.5 percent, by weight of the composition.

The hydroxyl-terminated chain-extending (curing) agents are preferably selected from the group consisting of ethylene glycol; diethylene glycol; polyethylene glycol; propylene glycol; 2-methyl-1,3-propanediol; 2-methyl-1,4-butanediol; monoethanolamine; diethanolamine; triethanolamine; monoisopropanolamine; diisopropanolamine; dipropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; N,N,N',N'-tetra-(2-hydroxypropyl)-ethylene diamine; diethylene glycol bis-(aminopropyl) ether; 1,5-pentanediol; 1,6-hexanediol; 1,3-bis-(2-hydroxyethoxy) cyclohexane; 1,4-cyclohexyldimethylol; 1,3-bis-[2-(2-hydroxyethoxy) ethoxy]cyclohexane; 1,3-bis-{2-[2-(2-hydroxyethoxy) ethoxy]ethoxy}cyclohexane; trimethylolpropane; polytetramethylene ether glycol (PTMEG), preferably having a molecular weight from about 250 to about 3900; and mixtures thereof. In addition, the following hydroxyl-terminated curing agents may be used: 1,7-heptanediol, 1,8-octanediol, 1,9-nonanediol, 1,10-decanediol, 1,11-undecanediol, and 1,12-dodecanediol. However, it is not required that only linear hydroxyl-terminated curing agents containing 1 to 12 carbon atoms be used in the method of this invention. For instance, linear hydroxyl-terminated curing agents containing greater than 12 carbon atoms such as tetradecanoic ($C_{14}$) diols, hexadecanoic ($C_{16}$) diols, and octadecanoic ($C_{18}$) diols may be used. In addition, alkyl or aryl substituted alkane diols containing greater than 12 carbon atoms may be used. As discussed above, the properties of the polyurethane composition depend in significant part upon the components or building blocks used to make the composition, particularly the polyisocyanates, moisture-resistant polyols, and curing agents of this invention. The above-mentioned hydroxyl-terminated curing agents may be used to make polyurethane compositions having enhanced tensile strength, impact durability, scuff/abrasion-resistance, resiliency, as well as moisture-resistance.

Suitable amine-terminated chain-extending (curing) agents that can be used in chain-extending the polyurethane prepolymer of this invention include, but are not limited to, unsaturated diamines such as 4,4'-diamino-diphenylmethane (i.e., 4,4'-methylene-dianiline or "MDA"), m-phenylenediamine, p-phenylenediamine, 1,2- or 1,4-bis(sec-butylamino) benzene, 3,5-diethyl-(2,4- or 2,6-) toluenediamine or "DETDA", 3,5-dimethylthio-(2,4- or 2,6-) toluenediamine, 3,5-diethylthio-(2,4- or 2,6-)toluenediamine, 3,3'-dimethyl-4,4'-diamino-diphenylmethane, 3,3'-diethyl-5,5'-dimethyl4,4'-diamino-diphenylmethane (i.e., 4,4'-methylene-bis(2-ethyl-6-methyl-benzeneamine)), 3,3'-dichloro-4,4'-diamino-diphenylmethane (i.e., 4,4'-methylene-bis(2-chloroaniline) or "MOCA"), 3,3',5,5'-tetraethyl-4,4'-diamino-diphenylmethane (i.e., 4,4'-methylene-bis(2,6-diethylaniline), 2,2'-dichloro-3,3',5,5'-tetraethyl-4,4'-diamino-diphenylmethane (i.e., 4,4'-methylene-bis(3-chloro-2,6-diethyleneaniline) or "MCDEA"), 3,3'-diethyl-5,5'-dichloro-4,4'-diamino-diphenylmethane, or "MDEA"), 3,3'-dichloro-2,2',6,6'-tetraethyl-4,4'-diamino-diphenylmethane, 3,3'-dichloro-4,4'-diamino-diphenylmethane, 4,4'-methylene-bis(2,3-dichloroaniline) (i.e., 2,2',3,3'-tetrachloro-4,4'-diamino-diphenylmethane or "MDCA"), 4,4'-bis (sec-butylamino)-diphenylmethane, N,N'-dialkylamino-diphenylmethane, trimethyleneglycol-di(p-aminobenzoate), polyethyleneglycol-di(p-aminobenzoate), polytetramethyleneglycol-di(p-aminobenzoate); saturated diamines such as ethylene diamine, 1,3-propylene diamine, 2-methyl-pentamethylene diamine, hexamethylene diamine, 2,2,4- and 2,4,4-trimethyl-1,6-hexane diamine, imino-bis(propylamine), imido-bis(propylamine), methylimino-bis(propylamine) (i.e., N-(3-aminopropyl)-N-methyl-1,3-propanediamine), 1,4-bis(3-aminopropoxy)butane (i.e., 3,3'-[1,4-butanediyl-bis-(oxy)bis]-1-propanamine), diethyleneglycol-bis(propylamine) (i.e., diethyleneglycol-di(aminopropyl)ether), 4,7,10-trioxatridecane-1,13-diamine, 1-methyl-2,6-diamino-cyclohexane, 1,4-diamino-cyclohexane, poly(oxyethylene-oxypropylene) diamines, 1,3- or 1,4-bis(methylamino)-cyclohexane, isophorone diamine, 1,2- or 1,4-bis(sec-butylamino)-cyclohexane, N,N'-diisopropyl-isophorone diamine, 4,4'-diamino-dicyclohexylmethane, 3,3'-dimethyl-4,4'-diamino-dicyclohexylmethane, 3,3'-dichloro-4,4'-diamino-dicyclohexylmethane, N,N'-dialkylamino-dicyclohexylmethane, polyoxyethylene diamines, 3,3'-diethyl-5,5'-dimethyl-4,4'-diamino-dicyclohexylmethane, polyoxypropylene diamines, 3,3'-diethyl-5,5'-dichloro-4,4'-diamino-dicyclohexylmethane, polytetramethylene ether diamines, 3,3',5,5'-tetraethyl-4,4'-diamino-dicyclohexylmethane (i.e., 4,4'-methylene-bis(2,6-diethylaminocyclohexane)), 3,3'-dichloro-4,4'-diamino-dicyclohexylmethane, 2,2'-dichloro-3,3',5,5'-tetraethyl-4,4'-diamino-dicyclohexylmethane, (ethylene oxide)-capped polyoxypropylene ether diamines, 2,2',3,3'-tetrachloro-4,4'-diamino-dicyclohexylmethane, 4,4'-bis(sec-butylamino)-dicyclohexylmethane; triamines such as diethylene triamine, dipropylene triamine, (propylene oxide)-based triamines (i.e., polyoxypropylene triamines), N-(2-aminoethyl)-1,3-propylenediamine (i.e., $N_3$-amine), glycerin-based triamines, (all saturated); tetramines such as N,N'-bis(3-aminopropyl)ethylene diamine (i.e., $N_4$-amine) (both saturated), triethylene tetramine; and other polyamines such as tetraethylene pentamine (also saturated). The amine curing agents used as chain extenders normally have a cyclic structure and a low molecular weight (250 or less). More preferably, the amine-terminated curing agent can be selected from the group consisting of: 1,3-propane diamine, 1,4-butane diamine, 1,5-pentane diamine, 1,6-hexane diamine, 1,7-heptane diamine, 1,8-octane diamine, 1,9-nonane diamine, 1,10-decane diamine, 1,11-undecane diamine, and 1,12-docdeane diamine, polymethylene-di-p-aminobenzoates, polyethyleneglycol-bis(4-aminobenzoates), polytetramethylene etherglycol-di-p-aminobenzoate, polypropyleneglycol-di-p-aminobenzoate, and mixtures thereof.

In yet other embodiment, a polyamide curing agent having multiple amino groups capable of reacting with the isocyanate groups and at least one amide group can be used. Polyamine polyamides can be used, wherein the polyamide chain is formed from condensation polymerization reaction of polyacid (including polyacid telechelic) and polyamine (including polyamine telechelic), with an equivalent ratio of polyamine to polyacid being greater than 1, such as about 1.1-5 or about 2. Mixtures of polyacid and polyamine can be, for example, hexamethylene diammonium adipate, hexamethylenediammonium terephthalate, or tetramethylene diammonium adipate. Alternatively, the polyamide chain can be formed partially or essentially from ring-opening polymerization of cyclic amides such as caprolactam. The polyamide chain can also be formed partially or essentially from polymerization of amino acid, including those that structurally correspond to the cyclic amides. The polyamide chain can comprise multiple segments formed from the same or different polyacids, polyamines, cyclic amides, and/or amino acids, non-limiting examples of which are disclosed herein. Suitable starting materials also include polyacid polymers, polyamine telechelics, and amino acid polymers. At least one polyacid, polyamine, cyclic amide, or amino acid having Mw of at least about 200, such as at least about 400, or at least about 1,000 can be used to form the backbone. A blend of at least two polyacids and/or a blend of at least two polyamines can be used, wherein one has a molecular weight greater than the other. The polyacid or polyamine of smaller molecular weight can contribute to hard segments in the polyamine polyamide, which may improve shear resistance of the resulting elastomer. For example, the first polyacid/polyamine can have a molecular weight of less than 2,000, and the second polyacid/polyamine can have a molecular weight of 2,000 or greater. In one example, a polyamine blend can comprise a first polyamine having a Mw of 1,000 or less, such as JEF-FAMINE. 400 (Mw of about 400), and a second polyamine having a Mw of 1,500 or more, such as JEFFAMINE 2000 (Mw of about 2,000). The backbone of the polyamine polyamide can have about 1-100 amide linkages, such as about 2-50, or about 2-20. Polyamine polyamides can be linear, branched, star-shaped, hyper-branched or dendritic (such as amine-terminated hyper-branched quinoxaline-amide polymers of U.S. Pat. No. 6,642,347, the disclosure of which is incorporated herein by reference).

When the polyurethane prepolymer is reacted with hydroxyl-terminated curing agents during the chain-extending step, as described above, the resulting composition is essentially a pure polyurethane composition. On the other hand, when the polyurethane prepolymer is reacted with an amine-terminated curing agent during the chain-extending step, any excess isocyanate groups in the prepolymer will react with the amine groups in the curing agent and create urea linkages having the following general structure:

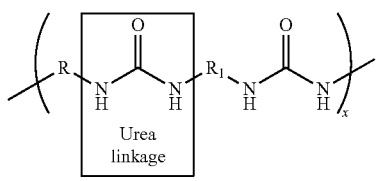

where x is the chain length, i.e., about 1 or greater, and R and $R_1$ are straight chain or branched hydrocarbon chain having about 1 to about 20 carbons.

This chain-extending step, which occurs when the polyurethane prepolymer is reacted with hydroxyl-terminated curing agents, amine-terminated curing agents, or mixtures thereof, builds-up the molecular weight and extends the chain length of the prepolymer. When the polyurethane prepolymer is reacted with hydroxyl-terminated curing agents, a polyurethane composition having urethane linkages is produced. When the polyurethane prepolymer is reacted with amine-terminated curing agents, a polyurethane/urea hybrid composition having urethane and urea linkages is produced. The polyurethane/urea hybrid composition is distinct from the pure polyurethane composition. The concentration of urethane and urea linkages in the hybrid composition may vary. In general, the hybrid composition may contain a mixture of about 10 to 90 wt. % urethane and about 90% to 10 wt. % urea linkages. The resulting polyurethane composition or polyurethane/urea hybrid composition has elastomeric properties based on phase separation of the soft and hard segments. The soft segments, which are formed from the polyol reactants, are generally flexible and mobile, while the hard segments, which are formed from the isocyanate and chain extenders, are generally stiff and immobile.

The polyurethane compositions used to produce the layer(s) of the golf ball of this invention have many advantageous physical properties and features. For example, the flexural modulus (as measured in accordance with ASTM D-790) of the polyurethane composition is generally about 10 to about 150 kpsi, preferably 15 to 125 kpsi, and more preferably 18 to 90 kpsi. In addition, the composition has an elongation at break (as measured in accordance with ASTM D-638) of about 100 to about 950%, preferably 125 to 750%, and more preferably 200 to 650%; a tensile strength at break (as measured in accordance with ASTM D-638) of about 1 to about 6 kpsi, preferably 2 to 5 kpsi, and more preferably 3 to 4.5 kpsi; and a notched Izod strength (as measured in accordance with ASTM D-256) of at least 10, preferably 15 to no break, and more preferably 20 to no break as measured at 23° C. The Vicat softening temperature (as measured in accordance with ASTM D-1525-70) of the composition is preferably about 60° to 180° C., and more preferably 75 to 150° C. Lastly, the density (as measured in accordance with ASTM D-792) of the composition is about 1.01 to about 1.60, preferably 1.02 to 1.50, and more preferably 1.03 to 1.30. It is important that the cover material of the golf ball has sufficient heat-resistance. If the cover material softens or melts, the dimples on the ball's surface will change shape and harmfully affect the aerodynamic properties of the ball. Thus, as mentioned above, the Vicat softening temperature of the polyurethane composition used to make the cover is preferably about 60° to 180° C., and more preferably 75 to 150° C.

In addition, the thermoset polyurethane compositions of this invention have a cross-link density in the range of about 10 to about 300 mol/m$^3$ (moles of effective network chains per cubic meter) and preferably about 15 to about 250 mol/m$^3$. The thermoset polyurethanes have good mechanical strength and toughness because of their good cross-linking network. By adjusting the cross-link density of the thermoset polyurethane composition, the scuff-resistance, toughness, and durability of the resulting golf ball cover can be improved. It is believed that the increase in cross-linking density may be due at least in part to the allophanate linkages formed in the reaction of the isocyanate, moisture-resistant polyol, and curing agent. Cross-link density is defined as moles of effective network chains per cubic meter and computed from swelling parameters of the networks and may be measured in accordance with the procedures described in V. Sekkar, S. Gopalakrishnan, and K. Ambika Devi, *Studies on Allophonate-Urethane Networks Based on Hydroxyl Terminated Polybutadiene: Effect of Isocyanate Type on the Network Characteristics*, European Polymer Journal 39, (2003) (pp. 1281-1290). The test specimens were paced in toluene for 48 hrs at ambient conditions. The specimens were removed from the solvent and weighed after gently wiping off the solvent from the surface of the specimen. Subsequently, the solvent absorbed was driven off by placing the swollen specimen in a vacuum oven at 100° C. for 2 hr and the weight of the deswollen (dried) specimen was determined From the weights of the swollen and deswollen specimens, and the densities of the polymer and the solvent, the volume fraction of the polymer in the swollen specimen was calculated. The crosslink densities of the polymer networks were obtained using Flory-Rhener equation.

Golf Ball Construction

The polyurethane compositions of this invention may be used with any type of ball construction known in the art. Such golf ball designs include, for example, single-piece, two-piece, three-piece, four-piece, and five-piece designs so long as at least one layer comprises a polyurethane composition prepared in accordance with this invention. The core, intermediate, and/or cover portions of the ball may be single or multi-layered.

Core

The cores in the golf balls of this invention may be solid, semi-solid, hollow, fluid-filled, or powder-filled. Typically, the cores are solid and made from rubber compositions containing a base rubber, free-radical initiator agent, cross-linking co-agent, and fillers. The base rubber may be selected, for example, from polybutadiene rubber, polyisoprene rubber, natural rubber, ethylene-propylene rubber, ethylene-propylene diene rubber, styrene-butadiene rubber, and combinations of two or more thereof. A preferred base rubber is polybutadiene. Another preferred base rubber is polybutadiene optionally mixed with one or more elastomers such as polyisoprene rubber, natural rubber, ethylene propylene rubber, ethylene propylene diene rubber, styrene-butadiene rubber, polystyrene elastomers, polyethylene elastomers, polyurethane elastomers, polyurea elastomers, acrylate rubbers, polyoctenamers, metallocene-catalyzed elastomers, and plastomers. As discussed further below, highly neutralized acid copolymers (HNPs), as known in the art, also can be used to form the core layer.

The base rubber typically is mixed with at least one reactive cross-linking co-agent to enhance the hardness of the rubber composition. Suitable co-agents include, but are not limited to, unsaturated carboxylic acids and unsaturated vinyl compounds. A preferred unsaturated vinyl is trimethylolpropane trimethacrylate. The rubber composition is cured using a conventional curing process. Suitable curing processes include, for example, peroxide curing, sulfur curing, high-energy radiation, and combinations thereof. In one embodiment, the base rubber is peroxide cured. Organic peroxides suitable as free-radical initiators include, for example, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. Cross-linking agents are used to cross-link at least a portion of the polymer chains in the composition. Suitable cross-linking agents include, for example, metal salts of unsaturated carboxylic acids having from 3 to 8 carbon atoms; unsaturated vinyl compounds and polyfunctional monomers (for example, trimethylolpropane trimethacrylate); phenylene bismaleimide; and combinations thereof. In a particular embodiment, the cross-linking agent is selected from zinc salts of acrylates, diacrylates, methacrylates, and dimethacrylates. In another particular embodiment, the cross-linking agent is zinc diacrylate ("ZDA"). Commercially available zinc diacrylates include those selected from Rockland React-Rite and Sartomer.

The rubber compositions also may contain "soft and fast" agents such as a halogenated organosulfur, organic disulfide, or inorganic disulfide compounds. Particularly suitable halogenated organosulfur compounds include, but are not limited to, halogenated thiophenols. Preferred organic sulfur compounds include, but not limited to, pentachlorothiophenol ("PCTP") and a salt of PCTP. A preferred salt of PCTP is ZnPCTP. A suitable PCTP is sold by the Struktol Company (Stow, Ohio) under the tradename, A95 ZnPCTP is commercially available from EchinaChem (San Francisco, Calif.). These compounds also may function as cis-to-trans catalysts to convert some cis-1,4 bonds in the polybutadiene to trans-1,4 bonds. Antioxidants also may be added to the rubber compositions to prevent the breakdown of the elastomers. Other ingredients such as accelerators (for example, tetra methylthiuram), processing aids, dyes and pigments, wetting agents, surfactants, plasticizers, as well as other additives known in the art may be added to the rubber composition. The core may be formed by mixing and forming the rubber composition using conventional techniques. These cores can be used to make finished golf balls by surrounding the core with outer core layer(s), intermediate layer(s), and/or cover materials as discussed further below. In another embodiment, the cores can be formed using highly neutralized polymer (HNP) compositions as disclosed in U.S. Pat. Nos. 6,756,436, 7,030, 192, 7,402,629, and 7,517,289. The cores from the highly neturalized polymer compositions can be further cross-linked using any free-radical initiation sources including radiation sources such as gamma or electron beam as well as chemical sources such as peroxides and the like. The core may contain sections having the same hardness or different hardness levels. That is, there can be uniform hardness throughout the different sections of the core or there can be hardness gradients across the layers. For example, in single cores, there may be a hard-to-soft gradient (a "positive" gradient) from the surface of the core to the geometric center of the core. In other instances, the there may be a soft-to-hard gradient (a "negative" gradient) or zero hardness gradient from the core's surface to the core's center. For dual core golf balls, the inner core layer may have a surface hardness that is less than the geometric center hardness to define a first "negative" gradient. As discussed above, an outer core layer may be formed around the inner core layer, and the outer core layer may have an outer surface hardness less than its inner surface hardness to define a second "negative" gradient. In other versions, the hardness gradients from surface to center may be hard-to-soft ("positive"), or soft-to-hard ("negative"), or a combination of both gradients. In still other versions the hardness gradients from surface to center may be "zero" (that is, the hardness values are substantially the same.) Methods for making cores having positive, negative, and zero hardness gradients are known in the art as described in, for example, U.S. Pat. Nos. 7,537,530; 7,537,529; 7,427,242; and 7,410,429, the disclosures of which are hereby incorporated by reference.

Figure 2:
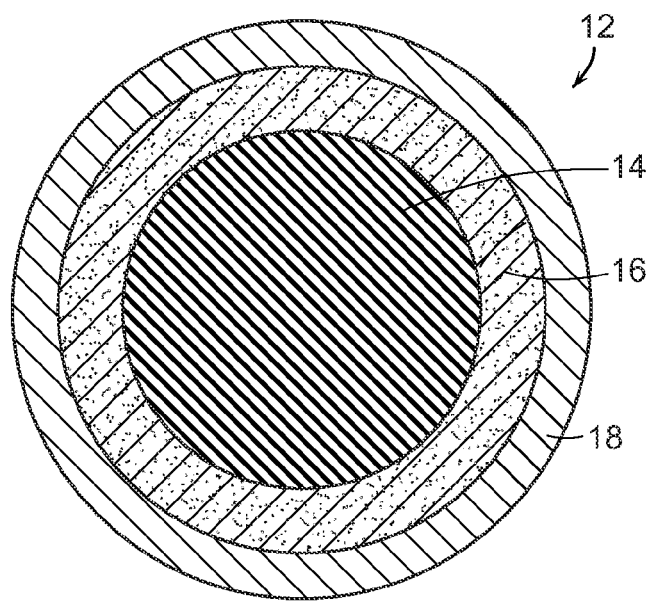
FIG. 2 is a cross-sectional view of a multi-layered (three-piece) golf ball having an intermediate layer made of a polyurethane composition in accordance with the present invention.
Figure 3:
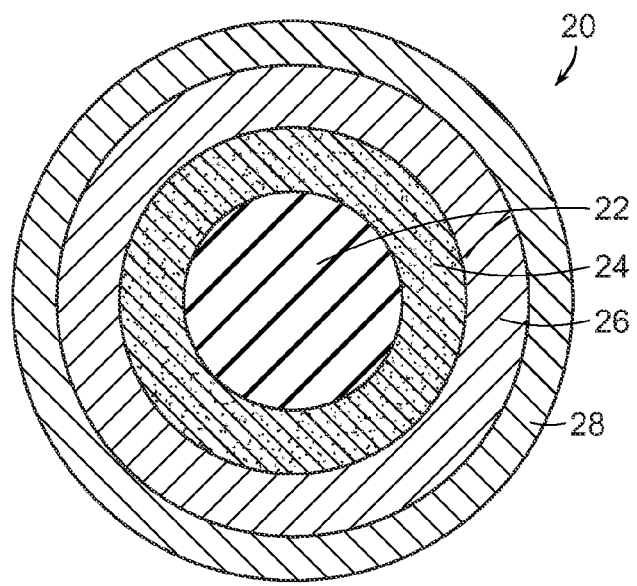
FIG. 3 is a cross-sectional view of a multi-layered (four-piece) golf ball having an outer core layer made of a polyurethane composition in accordance with the present invention.

Golf balls made in accordance with this invention can be of any size, although the USGA requires that golf balls used in competition have a diameter of at least 1.68 inches and a weight of no greater than 1.62 ounces. For play outside of USGA competition, the golf balls can have smaller diameters and be heavier. For example, the diameter of the golf ball may be in the range of about 1.68 to about 1.80 inches. In FIG. 1, one version of a golf ball that can be made in accordance with this invention is generally indicated at (10). Various patterns and geometric shapes of dimples (11) can be used to modify the aerodynamic properties of the golf ball (10). The dimples (11) can be arranged on the surface of the ball (10) using any suitable method known in the art. In one embodiment, as shown in FIG. 2, the core is a single-piece having an outside diameter of about 1.00 to about 1.65 inches. Preferably, the single-piece core has a diameter of about 1.50 to about 1.64 inches. The core generally makes up a substantial portion of the ball, for example, the core may constitute at least about 90% of the ball. The hardness of the core may vary depending upon desired properties of the ball. In general, core hardness is in the range of about 50 to about 90 Shore C and more preferably in the range of about 55 to about 75 Shore C. The compression of the core is generally in the range of about 30 to about 110 and more preferably in the range of about 50 to about 100. In a second embodiment, as shown in FIG. 3, the core is made up of two pieces. The inner core (22) may be made of a rubber or other suitable composition as described above, while the outer core layer (24) may be made of the polyurethane composition of this invention. In a preferred version, the outer core layer has a thickness in the range of about 0.030 to about 0.070 inches and a Shore D surface hardness in the range of about 50 to about 90 and more preferably in the range of about 55 to about 75 Shore D.

Intermediate and Cover Layers

The golf balls of this invention preferably include at least one intermediate layer. As used herein, the term, "intermediate layer" means a layer of the ball disposed between the core and cover. The intermediate layer may be considered an outer core layer or inner cover layer or any other layer disposed between the inner core and outer cover of the ball. The intermediate layer also may be referred to as a casing or mantle layer. The intermediate layer preferably has water vapor barrier properties to prevent moisture from penetrating into the rubber core. The ball may include one or more intermediate layers disposed between the inner core and outer cover.

The polyurethane composition of this invention can be used to make the outer core, intermediate layer, inner cover, and/or outer cover. In some instances, a traditional thermoplastic or thermosetting composition may be used to make one layer, and the polyurethane composition may be used to make a different layer of the golf ball depending upon the desired ball construction playing performance properties. If a conventional thermoplastic or thermosetting composition is used in one layer (and the polyurethane composition used in a different layer), then a wide variety of thermoplastic or thermosetting materials can be employed. These materials include for example, olefin-based copolymer ionomer resins (for example, Surlyn® ionomer resins and DuPont HPF® 1000 and HPF® 2000, commercially available from E. I. du Pont de Nemours and Company; Iotek® ionomers, commercially available from ExxonMobil Chemical Company; Amplify® IO ionomers of ethylene acrylic acid copolymers, commercially available from The Dow Chemical Company; and Clarix® ionomer resins, commercially available from A. Schulman Inc.); polyurethanes; polyureas; copolymers and hybrids of polyurethane and polyurea; polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, commercially available from Arkema Inc; cross-linked trans-polyisoprene and blends thereof; polyester-based thermoplastic elastomers, such as Hytrel®, commercially available from E. I. du Pont de Nemours and Company; polyurethane-based thermoplastic elastomers, such as Elastollan®, commercially available from BASF; synthetic or natural vulcanized rubber; and combinations thereof.

The polyurethane composition constituting the layer(s) of the golf ball may contain additives, ingredients, and other materials in amounts that do not detract from the properties of the final composition. These additive materials include, but are not limited to, activators such as calcium or magnesium oxide; fatty acids such as stearic acid and salts thereof; fillers and reinforcing agents such as organic or inorganic particles, for example, clays, talc, calcium, magnesium carbonate, silica, aluminum silicates zeolites, powdered metals, and organic or inorganic fibers, plasticizers such as dialkyl esters of dicarboxylic acids; surfactants; softeners; tackifiers; waxes; ultraviolet (UV) light absorbers and stabilizers; anti-oxidants; optical brighteners; whitening agents such as titanium dioxide and zinc oxide; dyes and pigments; processing aids; release agents; and wetting agents.

The polyurethanes of this invention may be blended with non-ionomeric and olefin-based ionomeric polymers to form the composition that will be used to make the golf ball layer. Examples of non-ionomeric polymers include vinyl resins, polyolefins including those produced using a single-site catalyst or a metallocene catalyst, polyurethanes, polyureas, polyamides, polyphenylenes, polycarbonates, polyesters, polyacrylates, engineering thermoplastics, and the like. The blend may contain about 10 to about 90% by weight of the polyurethane and about 90 to about 10% by weight of a non-ionomeric polymer. Particularly, the blend may contain a lower concentration of polyurethane in the amount of 10%, 20%, 30%, 40%, or 50% and an upper concentration of polyurethane in the amount of 60%, 70%, 80%, or 90%. Conversely, the concentration of non-ionomeric polymer may be relatively high (60%, 70%, 80%, or 90%) or relatively low (10%, 20%, 30%, 40%, or 50%.)

Olefin-based ionomers, such as ethylene-based copolymers, normally include an unsaturated carboxylic acid, such as methacrylic acid, acrylic acid, or maleic acid. Other possible carboxylic acid groups include, for example, crotonic, maleic, fumaric, and itaconic acid. "Low acid" and "high acid" olefin-based ionomers, as well as blends of such ionomers, may be used. In general, low acid ionomers are considered to be those containing 16 wt. % or less of carboxylic acid, whereas high acid ionomers are considered to be those containing greater than 16 wt. % of carboxylic acid. The acidic group in the olefin-based ionic copolymer is partially or totally neutralized with metal ions such as zinc, sodium, lithium, magnesium, potassium, calcium, manganese, nickel, chromium, copper, or a combination thereof. For example, ionomeric resins having carboxylic acid groups that are neutralized from about 10 percent to about 100 percent may be used. In one embodiment, the acid groups are partially neutralized. That is, the neutralization level is from 10 to 80%, more preferably 20 to 70%, and most preferably 30 to 50%. In another embodiment, the acid groups are highly or fully neutralized. That is, the neutralization level is from 80 to 100%, more preferably 90 to 100%, and most preferably 95 to 100%. The blend may contain about 10 to about 90% by weight of the polyurethane and about 90 to about 10% by weight of a partially, highly, or fully-neutralized olefin-based ionomeric copolymer. Particularly, the blend may contain a lower concentration of polyurethane in the amount of 10%, 20%, 30%, 40%, or 50% and an upper concentration of polyurethane in the amount of 60%, 70%, 80%, or 90%. Conversely, the concentration of non-ionomeric polymer may be relatively high (60%, 70%, 80%, or 90%) or relatively low (10%, 20%, 30%, 40%, or 50%). The above-mentioned blends may contain one or more suitable compatibilizers such as glycidyl acrylate or glycidyl methacrylate or maleic anhydride containing-polymers.

Golf Ball Dimensions and Properties

As discussed above, the polyurethane compositions of this invention may be used with any type of ball construction known in the art. Such golf ball designs include, for example, two-piece, three-piece, four-piece, and five-piece designs with single or multi-layered cores, intermediate and cover portions. The thickness and diameter of the different layers along with properties such as hardness and compression may vary depending upon the desired playing performance properties of the golf ball such as initial velocity, spin control, and feel.

Referring to FIG. 2, a three-piece golf ball (12) that can be made in accordance with this invention is illustrated. In this version, the ball (12) includes a solid core (14), an intermediate casing layer (16) and cover layer (18) made of the polyurethane composition, The core (14) is made of polybutadiene rubber or other suitable material as described above and preferably has a diameter in the range of about 1.30 to about 1.60 inches. The intermediate layer (16) is made of a thermoplastic or thermoset composition as described above. For example, the intermediate layer (16) may be formed from a compound selected from the group consisting of olefin-based ionomer copolymers; polyesters; polyester-ether elastomers; polyester-ester elastomers; polyamides; polyamide-ether elastomers, and polyamide-ester elastomers; polyurethanes, polyureas, and polyurethane-polyurea hybrids; and mixtures thereof. The range of thickness for the intermediate layer (16) may vary, but it generally has a thickness of about 0.015 to about 0.070 inches, preferably about 0.020 to about 0.050 inches, and more preferably about 0.025 to about 0.040 inches. The intermediate layer (16) preferably has a Shore D surface hardness of 45 to 75, preferably 55 to 70, and most preferably 60 to 65. The thickness of the cover layer (18) may vary, but it is generally in the range of about 0.015 to about 0.090 inches and more preferably 0.020 to about 0.040 inches.

In one preferred version of a three-piece golf ball, the core has a first Shore C surface hardness of $C_1$ in the range of about 50 to 90 and the cover layer has a second Shore D surface hardness of $C_2$ in the range of about 60 to 95. The ratio of $C_2$ to $C_1$ is in the range of about 0.6 to 1.4. It should be understood the three-piece golf ball construction shown in FIG. 2 is for illustrative purposes only and not meant to be restrictive. Other three-piece constructions can be made per this invention. For example, the intermediate layer (16) may be made of the polyurethane composition of this invention and the cover layer (18) may be made of a conventional thermoset or thermoplastic composition. In another embodiment, the intermediate and cover layers each may be formed from the polyurethane resin of this invention. Different additives may be incorporated into the resins, and the layers may have similar or different hardness levels. In order to make a visible distinction between the layers, various colorants, dyes, pigments, and the like can be added to the respective resins.

In FIG. 3, a four-piece golf ball (20) having a multi-layered core is illustrated. The multi-layered core includes an inner core (22) and outer core layer (24). The inner core (22) may be made of a first rubber material, for example, polybutadiene, or highly neutralized polymer (HNP) and the outer core layer (24) may be made of the polyurethane composition of this invention. The golf ball further includes an intermediate casing layer (26) and cover layer (28), which may have the same thickness dimensions as described above. Conventional thermoplastic or thermoset resins such as olefin-based ionomeric copolymers, polyamides, polyesters, polycarbonates, polyolefins, polyurethanes, and polyureas as described above can be used to make the casing layer (26) and/or cover layer (28). In such multi-layered cores, the inner core (22) preferably has a diameter of about 0.50 to about 1.30 inches, more preferably 1.00 to 1.15 inches, and may be relatively soft (that is, it may have a compression of less than about 30.) Meanwhile, the encapsulating outer core layer (24) generally has a thickness of about 0.030 to about 0.070 inches, preferably 0.035 to 0.065 inches and may be relatively hard (compression of about 70 or greater). That is, the two-piece core, which is made up of the inner core (22) and outer core layer (24), preferably has a total diameter of about 1.50 to about 1.64 inches, more preferably 1.510 to 1.620 inches, and a compression of about 80 to about 115, more preferably 85 to 110.

In FIG. 3, the illustrated four-piece golf ball is not meant to be limiting. Other four-piece constructions can be made per this invention. For example, the intermediate casing layer (26) and/or cover layer (28) may be made of the same polyurethane composition of this invention. Different additives may be incorporated into the resins, and the layers may have similar or different hardness levels. In order to make a visible distinction between the layers, various colorants, dyes, pigments, and the like can be added to the respective resins.

Figure 4:
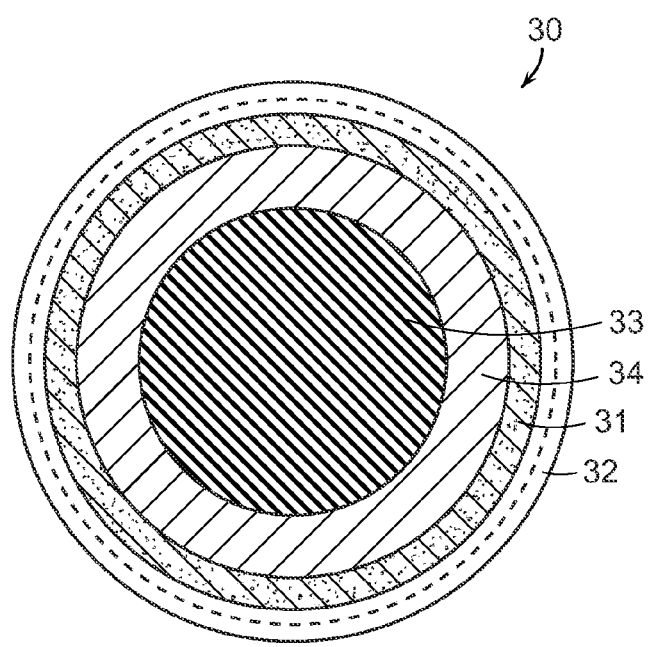
FIG. 4 is a cross-sectional view of a multi-layered (four-piece) golf ball having an inner cover layer made of a polyurethane composition in accordance with the present invention.

Turning to FIG. 4, a four-piece golf ball (30) having a multi-layered cover is shown. The ball (30) includes a solid, rubber center (33), an outer core layer (34), and multi-layered cover constituting an inner cover layer (31) and outer cover layer (32). The solid rubber center (33) preferably has a diameter of about 0.50 to about 1.30 inches, and more preferably 1.00 to 1.15 inches, while the surrounding outer core layer (34) preferably has a thickness of about 0.030 to about 0.070 inches, and more preferably 0.035 to 0.065 inches. In this version, the inner cover layer (31) is made of a conventional thermoplastic or thermosetting resin and the outer cover layer (32) is made of the polyurethane composition of this invention. The inner cover layer (31) preferably has a thickness of about 0.020 to about 0.050 inches and Shore C surface hardness of about 60 to about 95. The inner cover (31) may be made of an ionomer resin or any other suitable inner cover material as described above. The outer cover layer (32), which surrounds the inner cover layer (31), is preferably made of the polyurethane composition of this invention. The outer cover layer (32) preferably has a thickness in the range of about 0.020 to about 0.035 inches and a Shore C surface hardness in the range of about 50 to about 90. The four-piece golf ball construction shown in FIG. 4 is but one example and other four-piece constructions can be made in accordance with this invention. For instance, in another version, the inner cover layer (31) may be made of the polyurethane composition of this invention. The inner and outer cover layers may be of different hardness levels. In one preferred embodiment, the inner cover has a greater hardness than the outer cover.

Figure 5:
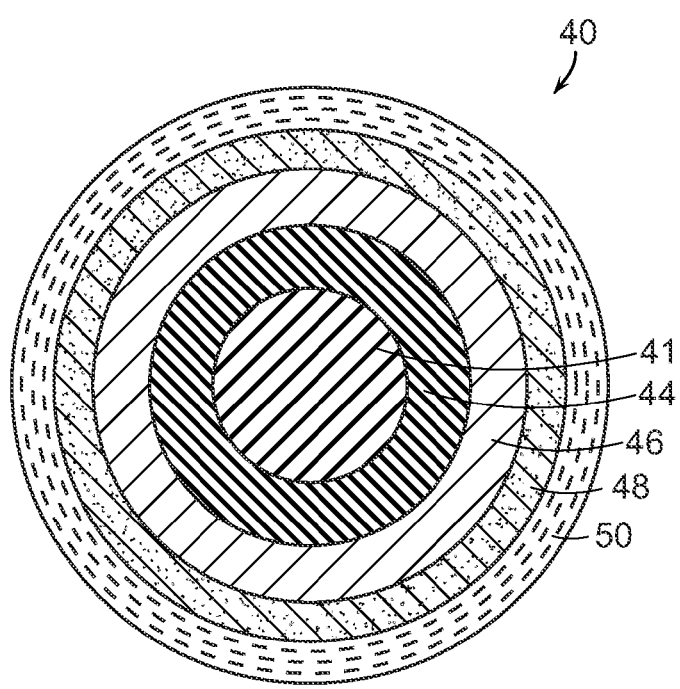
FIG. 5 is a cross-sectional view of a multi-layered (five-piece) golf ball having a multi-layered core, intermediate layer, and outer cover layer made in accordance with the present invention.

In FIG. 5, a five-piece golf ball (40) having a cover with three-layers is shown. The ball includes a solid, rubber center (41), an outer core layer (44), and multi-layered cover constituting an inner cover layer (46), intermediate cover layer (48) and outer cover layer (50). In this version, the inner and intermediate cover layers (46, 48) are made of conventional thermoplastic or thermosetting resins and the outer cover layer (50) is made of the polyurethane composition of this invention. The inner cover layer (46) preferably has a Shore C surface hardness of about 60 to about 95. The intermediate cover (48) preferably has a Shore C surface hardness of about 30 to about 50. The outer cover layer (50) preferably has a Shore C surface hardness of about 60 to about 95. That is, in one preferred embodiment, the intermediate cover layer (48) has a Shore C surface hardness that is softer than both the inner cover layer (46) and outer cover layer (50).

As noted above, the golf ball constructions shown in FIGS. 1-5 are for illustrative purposes only and are not meant to be restrictive. A wide variety of golf ball constructions may be made in accordance with the present invention depending upon the desired properties of the ball so long as at least one layer contains the polyurethane composition of this invention.

Preferably, the overall diameter of the core and all intermediate layers is about 80 percent to about 98 percent of the overall diameter of the finished ball. The core may have a diameter ranging from about 0.50 inches to about 1.65 inches.

In one embodiment, the diameter of the core is about 1.20 inches to about 1.63 inches. For example, if a two-piece ball having a core and polyurethane cover of this invention is made, the core may have a diameter ranging from about 1.50 inches to about 1.62 inches. The core may further include a moisture-resistant surface to prevent moisture from penetrating there in. When the core includes an inner core layer (center) and an outer core layer, the inner core layer is preferably about 0.50 inches or greater and the outer core layer preferably has a thickness of about 0.10 inches or greater. For example, when a multi-layer core is made, the center may have a diameter ranging from about 0.5 inches to about 1.30 inches and the outer core layer may have a diameter ranging from about 0.12 inches to about 0.5 inches. The polyurethane cover of this invention has a thickness to provide sufficient strength, good performance characteristics, and durability. In one embodiment, the cover thickness is from about 0.150 inches to about 0.090 inches, preferably about 0.070 inches or less. For example, when a two-piece ball according to invention is made, the cover may have a thickness ranging from about 0.030 inches to about 0.090 inches. In another instance, when a three-piece ball is made, the thickness of the cover may be about 0.020 to about 0.060 inches. Likewise, the range of thicknesses for the intermediate layer may vary, because the intermediate layer may be used in many different constructions and more than one intermediate layer may be included in the ball. For example, the intermediate layer may be used as an outer core layer, an inner cover layer, and/or a moisture/vapor barrier layer. In general, the intermediate layer may have a thickness of about 0.120 inches or less. In general, the thickness of the intermediate layer is about 0.015 to about 0.120 inches and preferably about 0.020 to about 0.060 inches. In one embodiment, the thickness of the intermediate layer is from about 0.015 inches to about 0.100 inches.

The hardness of the golf ball (or subassembly such as the core) may vary depending upon the ball construction and desired performance properties. The test methods for measuring surface and material hardness are described in further detail below. In general, surface or material hardness refers to the firmness of the surface or material. The relative hardness levels of the core layer, intermediate layer(s), and cover layer are primary factors in determining distance performance and spin rate of the ball. As a general rule, when the ball has a relatively soft cover, the initial spin rate of the ball is relatively high and when the ball has a relatively hard cover, the initial spin rate of the ball is relatively low. Furthermore, in general, when the ball contains a relatively soft core, the resulting spin rate of the ball is relatively low. The compressive force acting on the ball is less when the cover is compressed by the club face against a relatively soft core. The club face is not able to fully interface with the ball and thus the initial spin rate on the ball is lower. On the other hand, when the ball contains a relatively hard core, the resulting spin rate of the ball is relatively high. The club face is able to more fully interface with the ball and thus the initial spin rate of the ball. The surface hardness of a golf ball layer (or other spherical surface) is obtained from the average of a number of measurements taken from opposing hemispheres, taking care to avoid making measurements on the parting line of the core or on surface defects such as holes or protrusions. In general, the COR of the ball will increase as the hardness of the ball is increased. The test methods for measuring surface and material hardness are described in further detail below.

As discussed above, in one version of the golf ball of the present invention, the core preferably has a first surface hardness ($C_1$) in the range of about 50 to about 95 Shore C, more preferably about 55 to about 85 Shore C, and most preferably about 60 to about 75 Shore C. Meanwhile, the cover layer preferably has a second surface hardness ($C_2$) in the range of about 65 to about 95 Shore C, more preferably about 65 to about 90 Shore C, and most preferably about 70 to about 85 Shore C. And, the ratio of $C_2$ to $C_1$ is in the range of 0.6 to 1.4.

In yet another embodiment, the hardness of the core ($C_1$) is in the range of about is about 55 to about 95 Shore C and more preferably about 60 to about 90 Shore C. Meanwhile, the cover layer preferably has a second surface hardness ($C_2$) in the range of about 50 to about 95 Shore C and more preferably about 60 to about 85 Shore C. And, the ratio of $C_2$ to $C_1$ is in the range of 0.5 to 1.5.

The intermediate layer(s) may also vary in hardness. In one embodiment, the hardness of the intermediate layer is in the range of about 30 to about 90 Shore D, preferably about 80 Shore D or less, and more preferably about 70 Shore D or less. For example, when an intermediate layer is formed from the composition of the invention, the hardness of the intermediate layer may be about 65 Shore D or less, preferably ranging from about 35 to about 60 Shore D. In yet another embodiment, the hardness of the intermediate layer is about 50 Shore D or greater, preferably about 55 Shore D or greater. In one embodiment, the intermediate layer hardness is from about 55 to about 65 Shore D.

There are several other physical properties of the golf ball that affect the ball's playing performance For example, the compression of the core can affect the ball's spin rate off the driver as well as the "feel" of the ball as the club face makes impact with the ball. In general, balls with relatively low compression values have a softer feel. As disclosed in Jeff Dalton's *Compression by Any Other Name, Science and Golf IV, Proceedings of the World Scientific Congress of Golf* (Eric Thain ed., Routledge, 2002) ("J. Dalton") several different methods can be used to measure compression including Atti compression, Riehle compression, load/deflection measurements at a variety of fixed loads and offsets, and effective modulus. The test methods for measuring compression in accordance with the present invention are described in further detail below.

The "coefficient of restitution" or "COR" of a golf ball is also another important property and this refers to the ratio of a ball's rebound velocity to its initial incoming velocity when the ball is fired out of an air cannon into a rigid vertical plate. The COR for a golf ball is written as a decimal value between zero and one. A golf ball may have different COR values at different initial velocities. The United States Golf Association (USGA) sets limits on the initial velocity of the ball so one objective of golf ball manufacturers is to maximize the COR under these conditions. Balls with a higher rebound velocity have a higher COR value. Such golf balls rebound faster, retain more total energy when struck with a club, and have longer flight distance. In general, the COR of the ball will increase as the hardness of the ball is increased. The test methods for measuring COR are described in further detail below.

The golf balls of the present invention preferably have a "coefficient of restitution" ("COR") of at least 0.750 and more preferably at least 0.800 and compression of from about 70 to about 110, preferably from 90 to 100.

The moisture vapor transmission rate (MVTR) of the layers in the golf ball also is significant in golf ball design and construction. As discussed above, the inner core (or center) helps provide resiliency to the golf ball. As the core absorbs water, it tends to lose its resiliency. The compression and COR of the ball may be reduced significantly if a large amount of water vapor permeates into the core. Layers of the golf balls, which are made of the polyurethane composition of this invention, help minimize moisture penetration into the core. Preferably, the moisture vapor barrier layer has a thickness of 0.002 to 0.010 inches, and a moisture vapor transmission rate of less than about 4.0 grams·mm/m$^2$·day, more preferably less than 3 grams·mm/m$^2$·day, and most preferably less than 1.0 grams·mm/m$^2$·day, particularly 0.5 to 1.0 grams·mm/m$^2$·day. The moisture vapor transmission rate is defined as the mass of moisture vapor that diffuses into a material of a given thickness per unit area per unit time. The test methods for measuring MVTR are described in further detail below.

Methods of Constructing Golf Ball Layers

The golf balls of the invention may be formed using a variety of application techniques such as compression molding, flip molding, injection molding, retractable pin injection molding, reaction injection molding (RIM), liquid injection molding (LIM), casting, vacuum forming, powder coating, flow coating, spin coating, dipping, spraying, and the like. Conventionally, compression molding and injection molding are applied to thermoplastic materials, whereas RIM, liquid injection molding, and casting are employed on thermoset materials. These and other manufacturing methods are disclosed in U.S. Pat. Nos. 6,207,784 and 5,484,870, the disclosures of which are hereby incorporated by reference. The cores of the golf balls of the invention may be formed by any suitable method known to those of ordinary skill in art. When the cores are formed from a thermoset material, compression molding is a particularly suitable method of forming the core. On the other hand, the cores may be injection molded when the cores are formed using a thermoplastic material.

More particularly, the polyurethane composition of this invention used to form the thermoset cover of other layer of the golf ball of this invention is a castable, reactive liquid that can be applied over the golf ball subassembly (for example, core and overlying casing layer) using any suitable application technique spraying, dipping, spin coating, or flow coating methods which are known in the art. The liquid nature of the polyurethane composition of this invention makes it possible to be applied as a thin outer cover layer to the golf ball. For example, in one version of the casting method, the polyurethane mixture is dispensed into the cavity of an upper mold member. This first mold-half has a hemispherical structure. Then, the cavity of a corresponding lower mold member is filled with the polyurethane mixture. This second mold-half also has a hemispherical structure. The cavities are typically heated beforehand. A ball cup holds the golf ball subassembly (core and overlying casing layer) under vacuum. After the polyurethane mixture in the first mold-half has reached a semi-gelled or gelled sate, the pressure is removed and the golf ball is lowered into the upper mold-half containing the polyurethane mixture. Then, the first mold-half is inverted and mated with the second mold-half containing polyurethane mixture which also has reached a semi-gelled or gelled state. The polyurethane mixtures, contained in the mold members that are mated together, form the golf ball cover. The mated first and second mold-halves containing the polyurethane mixture and golf ball center may be next heated so that the mixture cures and hardens. Then, the golf ball is removed from the mold and heated and cooled accordingly.

The intermediate layer and/or cover layer may also be formed using any suitable method known to those of ordinary skill in the art. For example, an intermediate layer may be formed by blow molding or retractable pin molding and covered with a dimpled cover layer formed by injection molding, compression molding, casting, vacuum forming, powder coating, and the like. The use of various dimple patterns and profiles provides a relatively effective way to modify the aerodynamic characteristics of a golf ball. As such, the manner in which the dimples are arranged on the surface of the ball can be by any available method. For instance, the ball may have an icosahedron-based pattern, such as described in U.S. Pat. No. 4,560,168, or an octahedral-based dimple patterns as described in U.S. Pat. No. 4,960,281. Furthermore, the resultant golf balls prepared according to the invention typically will have dimple coverage greater than about 60 percent, preferably greater than about 65 percent, and more preferably greater than about 70 percent.

Golf Ball Post-Cross-Linking

The components in the golf balls of this invention may be cross-linked by a variety of chemical and irradiation methods. For example, peroxides or sulfur-based agents can be used to induce cross-linking of the polymer chains. High-energy radiation, which is capable of generating free radicals, also may be used to cross-link the composition. Preferably, the polyurethane compositions of this invention demonstrate an increase in Shore D surface hardness of at least 2.5% upon being treated with chemical and/or irradiation methods to induce cross-linking. More preferably, the increase in Shore D surface hardness is in the range of about 2.5 to 20%. Ordinarily, the thermoset polyurethane compositions of this invention have a relatively high amount of cross-linking in their polymer chains. When these thermoset polyurethane compositions, along with the other components in the golf ball, undergo a post cross-linking process, there should be additional cross-linking. The resulting golf ball will have increased hardness and toughness, but there will be no substantial loss in physical properties such as cut/tear-resistance; scuff/wear-resistance; or playing performance such as the soft feel and shot control of the ball. That is, even though the post cross-linking process generates a ball having higher hardness, the cover of the ball does not become brittle and there is no sacrifice of other physical properties. The ball covers maintain their high durability and resiliency as well as soft feel. It is believed that this increase in hardness while maintaining the other desirable properties is due to the building blocks used to make the thermoset polyurethane composition, particularly the polyisocyanates, moisture-resistant polyols, and curing agents of this invention.

Examples of suitable radiation sources include electron beams, ultra-violet (UV), gamma, X-ray, and infrared rays, heat, and combinations thereof. Organic peroxides that can be used as free-radical initiators include, for example, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. The peroxide free-radical initiators are generally present in the polyurethane composition in an amount within the range of 0.05 to 15 parts by weight per 100 parts of the base composition.

Cross-linking agents having an average functionality greater than 2.0 can be added to the composition. For example, the cross-linking agent can be added to the mixture of the isocyanate compound, moisture-resistant polyol, and chain extender. Suitable cross-linking agents include, for example, metal salts of unsaturated carboxylic acids having from 3 to 8 carbon atoms; unsaturated vinyl compounds and polyfunctional monomers (for example, trimethylolpropane trimethacrylate (TMP and pentaerythritol)); phenylene bismaleimide; and combinations thereof. Particularly suitable metal salts include, for example, one or more metal salts of acrylates, diacrylates, methacrylates, and dimethacrylates, wherein the metal is selected from magnesium, calcium, zinc, aluminum, lithium, and nickel. In a particular embodiment, the cross-linking agent is selected from zinc salts of acrylates, diacrylates (ZDA), methacrylates, and dimethacrylates. The cross-linking agent typically is included in the base composition in an amount within the range of 1 to 70 parts.

The composition may further contain one or more photoinitiators that can be activated by actinic radiation and initiate free radical cross-linking. Suitable photoinitiators include, for example, aromatic ketone compounds such as benzophenones, in combination with tertiary amines, alkylbenzophenones, 4,4'-bis(dimethylamino)benzophenone (Michler's ketone), anthrone and halogenated benzophenones or mixtures of said types. Other photoinitiators, such as benzoin and its derivatives, benzyl ketals, acylphosphine oxides, for example, 2,4,6-tri-methylbenzoyldiphenylphosphine oxide, bisacylophosphine oxides, phenylglyoxylic acid esters, camphorquinone, .α-aminoalkylphenones, .α,α-dialkoxyacetophenones, 1-[4-(phenylthio)phenyl]octane-1,2-dione-2-(O-benzoyloxime) and α-hydroxyalkylphenones, are suitable. The photoinitiator typically is included in the base composition in aan amount within the range of 0.1 to 10 weight percent.

As noted above, high energy radiation may be used to induce cross-linking. Gamma radiation penetrates relatively deep into the material undergoing irradiation, but also increases cross-linking of the inner core. Accordingly, the compression of the core can be adjusted to allow for any increase in hardness that results from the cross-linking. The type of radiation source used will depend in part upon the composition of the underlying layers in the golf ball. In addition, the level of irradiation will depend upon the desired end properties and characteristics of the finished golf ball.

The golf balls of this invention may be post-processed using conventional techniques as is customary in the industry. For example, the golf ball cover may first be painted with a composition comprising white or other colored concentrate. Then, indicia (such as a ball number, a ball brand name, and/or a company name or logo) can be applied to the surface of the ball using a pad-printing process. Once the ink indicia have been printed on the ball, a clear protective top-coat is commonly applied over the print to provide the ball with a shiny surface. The top-coat provides the ball with a smooth, substantially tack-free surface. A prime coat, typically a film about one-half the thickness of the clear coat, may be applied before production printing or over the production print and before application of the clear coat.

Because the polyurethane compositions of the invention may be used in any layer of a golf ball, the golf ball construction, physical properties, and resulting performance may vary greatly depending on the layer(s) of the ball that include the compositions of this invention. The polyurethane compositions provide the golf ball with advantageous properties and features. For example, as discussed above, the compositions may be used to make the outer core, intermediate layer, inner cover, and/ore outer cover. As discussed above, the molecular weight of the thermoset polyurethane composition may increase and the hardness of the ball may increase due to the post cross-linking mechanism, but the resulting ball does not exhibit brittleness or other undesirable physical properties. Of course, the cross-linking density of the thermoset polyurethane composition also increases during this post cross-linking treatment. That is, the cross-link density of the polyurethane composition that has been further cross-linked by chemical or radiation treatment is greater than the cross-link density of the starting polyurethane composition. The cover of the ball retains its high impact durability and cut/tear-resistance. The ball has high resiliency so that it shows good flight distance when hit off a tee. At the same time, the ball maintains a soft "feel" so that its flight path can be controlled on approach shots near the green. The combination of the core and cover layer(s) made from the polyurethane composition of this invention results in a golf ball having enhanced resiliency and durability characteristics while maintaining the desirable feel and playability of the ball. The polyurethane composition can be used to manufacture golf balls having an optimum combination of high resiliency, impact durability, and soft feel. The combination of the polyurethane and other materials comprising the core, intermediate layer and/or cover layer provides a finished ball that can be used to achieve increased distance. And yet, the golf ball retains a relatively soft feel and has a good spin rate Thus, players can more easily control the play of the ball.

Test Methods

Hardness Shore D Hardness measurements are made pursuant to ASTM D-2240 "Indentation Hardness of Rubber and Plastic by Means of a Durometer." Because of the curved surface of the golf ball layer, care must be taken to ensure that the golf ball or golf ball subassembly is centered under the durometer indentor before a surface hardness reading is obtained. A calibrated digital durometer, capable of reading to 0.1 hardness units, is used for all hardness measurements and is set to take hardness readings at 1 second after the maximum reading is obtained. The digital durometer must be attached to and its foot made parallel to the base of an automatic stand. The weight on the durometer and attack rate conforms to ASTM D-2240. It should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other. JIS-C hardness was measured according to the test methods JIS K 6301-1975. Shore C hardness was measured according to the test methods D2240-05.

Compression For purposes of the present invention, "compression" refers to Atti compression and is measured according to a known procedure, using an Atti compression device, wherein a piston is used to compress a ball against a spring. The travel of the piston is fixed and the deflection of the spring is measured. The measurement of the deflection of the spring does not begin with its contact with the ball; rather, there is an offset of approximately the first 1.25 mm (0.05 inches) of the spring's deflection. Cores having a very low stiffness will not cause the spring to deflect by more than 1.25 mm and therefore have a zero compression measurement. The Atti compression tester is designed to measure objects having a diameter of 1.680 inches; thus, smaller objects, such as golf ball cores, must be shimmed to a total height of 1.680 inches to obtain an accurate reading. Conversion from Atti compression to Riehle (cores), Riehle (balls), 100 kg deflection, 130-10 kg deflection or effective modulus can be carried out according to the formulas given in J. Dalton.

Coefficient of Restitution ("COR") In the present invention, COR is determined according to a known procedure, wherein a golf ball or golf ball subassembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. The COR is then calculates as the ratio of the ball's outgoing transit time period to the ball's incoming transit time period ($COR=V_{out}/V_{in}=T_{in}/T_{out}$).

Moisture Vapor Transmission Rate ("MVTR") The preferred standards of measuring the moisture vapor transmission rate include ASTM F1249-90 entitled "Standard Test Method for Water Vapor Transmission Rate Through Plastic Film and Sheeting Using a Modulated Infrared Sensor," ASTM F372-94 entitled "Standard Test Method for Water Vapor Transmission Rate of Flexible Barrier Materials Using an Infrared Detection Technique," and ASTM D-96 entitled "Water Vapor Transmission Rate" among others.

As used herein, the term "about," used in connection with one or more numbers or numerical ranges, should be understood to refer to all such numbers, including all numbers in a range. It also should be understood that when concentrations, amounts, and other numerical data are presented herein in a range format, they should be interpreted flexibly to include not only the numerical values explicitly recited as the limits of the range, but also to include all the individual numerical values or sub-ranges encompassed within that range as if each numerical value and sub-range is explicitly recited. Furthermore, the invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

We claim:

1. A golf ball, comprising:
a core having a first Shore C surface hardness of $C_1$ in the range of 50 to 90, the core being formed from a rubber composition;
an intermediate layer surrounding the core, the intermediate layer being formed from a olefin-based acid copolymer ionomer composition and having a hardness in the range of 30 to 90 Shore D; and
a cover layer surrounding the intermediate layer having a second Shore C surface hardness of $C_2$ in the range of 60 to 95, the cover layer being formed from a thermoset polyurethane or polyurethane-urea composition that is produced by a reaction of: i) an isocyanate compound, ii) a moisture-resistant polyol having a weight average molecular weight in the range of 500 to 10,000 grams per mole, and iii) a curing agent selected from hydroxyl-terminated or amine-terminated curing agents, and mixtures thereof, and wherein the ratio of $C_2$ to $C_1$ is in the range of 0.6 to 1.4, wherein the cover layer has a moisture vapor transmission rate between 3 grams·mm/m²·day to 4 grams·mm/m²·day.

2. The golf ball of claim 1, wherein the rubber composition is selected from the group consisting of polybutadiene, polyisoprene, natural rubber, ethylene-propylene, ethylene-propylene diene, and styrene-butadiene rubbers, and mixtures thereof.

3. The golf ball of claim 2, wherein the rubber composition is polybutadiene rubber.

4. The golf ball of claim 1, wherein the olefin-based acid copolymer ionomer composition is an ethylene based acid copolymer.

5. The golf ball of claim 1, wherein the olefin-based add copolymer contains acid groups selected from the group consisting of methacrylic, acrylic, maleic, crotonic, fumaric, and itaconic add.

6. The golf ball of claim 5, wherein the olefin-based acid copolymer contains acid groups in an amount of 16 wt. % or less.

7. The golf ball of claim 5, wherein the olefin-based add copolymer contains acid groups in an amount of greater than 16 wt. %.

8. The golf ball of claim 1, wherein the add groups of the olefin-based add copolymer are neutralized to a neutralization level of 10 to 80%.

9. The golf ball of claim 5, wherein the add groups of the olefin-based acid copolymer are neutralized to a neutralization level of 80 to 100%.

10. A golf ball, comprising:
a core having an inner core and outer core layer, the inner core having a first Shore C surface hardness of $C_1$ in the range of 50 to 90, and the outer core layer having a Shore D surface hardness in the range of about 50 to about 90;
an intermediate layer surrounding the core, the intermediate layer being formed from a olefin-based add copolymer ionomer composition and having a hardness in the range of 30 to 90 Shore D; and
a cover layer surrounding the intermediate layer having a second Shore C surface hardness of $C_2$ in the range of 60 to 95, the cover layer being formed from a thermoset polyurethane or polyurethane-urea composition that is produced by a reaction of: i) an isocyanate compound, ii) a moisture-resistant polyol having a weight average molecular weight in the range of 500 to 10,000 grams per mole, and iii) a curing agent selected from hydroxyl-terminated or amine-terminated curing agents, and mixtures thereof, and wherein the ratio of $C_2$ to $C_1$ is in the range of 0.6 to 1.4, wherein the cover layer has a moisture vapor transmission rate between 3 grams·mm/m²·day to 4 grams·mm/m²·day.

* * * * *